(12) United States Patent
Chen (10) Patent No.: US 7,545,563 B2
(45) Date of Patent: Jun. 9, 2009

(54) LIGHTWEIGHT COMPACTIBLE PROJECTION SCREEN FOR TRADE SHOW AND OTHER USES

(76) Inventor: Shane Chen, 1821 NW Eight Ave., Camas, WA (US) 98607

( * ) Notice: Subject to any disclaimer, the term of this patent is extended or adjusted under 35 U.S.C. 154(b) by 0 days.

(21) Appl. No.: 11/654,490

(22) Filed: Jan. 16, 2007

(65) Prior Publication Data
US 2007/0273966 A1 Nov. 29, 2007

Related U.S. Application Data

(60) Provisional application No. 60/759,129, filed on Jan. 13, 2006.

(51) Int. Cl.
*G03B 21/56* (2006.01)
*G03B 21/60* (2006.01)
(52) U.S. Cl. .................. 359/451; 359/459; 359/461
(58) Field of Classification Search ........... 359/451, 359/461, 457, 443, 459
See application file for complete search history.

(56) References Cited

U.S. PATENT DOCUMENTS

| 4,473,355 | A | * | 9/1984 | Pongratz ..................... 434/44 |
| 4,525,029 | A | * | 6/1985 | Inoue et al. ................. 359/457 |
| 5,130,846 | A | * | 7/1992 | Kowalchuk ................. 359/443 |
| 5,402,263 | A | * | 3/1995 | Kita et al. ................... 359/451 |
| 6,501,599 | B1 | | 12/2002 | Randolph et al. |
| 2007/0133089 | A1 | * | 6/2007 | Lipton et al. ............... 359/451 |

FOREIGN PATENT DOCUMENTS

WO        WO 01/13172        2/2001

* cited by examiner

*Primary Examiner*—Christopher E Mahoney
(74) *Attorney, Agent, or Firm*—Steven J. Adamson (57) ABSTRACT

A screen for a trade show or like environment that is lightweight, flexible and compactible. The screen may be patterned to include a plurality of ridges extending from a top to a bottom thereof that serve to reflect projected light into a larger field of view. The screen may be concave about a horizontal axis or otherwise arranged to reflect projected light toward a desired audience. Various releasable, biased mechanisms for attaching a flexible screen member to a disassembleable frame structure are also disclosed.

22 Claims, 6 Drawing Sheets

LIGHTWEIGHT COMPACTIBLE PROJECTION SCREEN FOR TRADE SHOW AND OTHER USES

CROSS REFERENCE TO RELATED APPLICATIONS

This application claims the benefit of earlier filed U.S. Provisional Patent Application No. 60/759,129, filed Jan. 13, 2006, entitled Lightweight, Curved Projection Screen for Trade Show and Other Uses and having the same inventor as above.

FIELD OF THE INVENTION

The present invention relates to portable projection screens and projector-screen arrangements for use at trade shows or for other uses.

BACKGROUND OF THE INVENTION

The prior art includes various projection screens. These include those described in U.S. Pat. No. 5,414,558 issued to You, U.S. Pat. No. 6,501,599 issued to Randolph, and PCT Application no. PCT/EP99/05881 (WO 01/13172) in the name of Meersseman.

The device of You is disadvantageous because it is made of metal which causes it to be heavy, rigid, non-compressible and non-compactible. Furthermore, the cost of metal material may make the screen undesirably expensive.

The device of Meersseman is disadvantageous, among other reasons, in that it is curved inwardly (concave) about a vertical axis causing it to have a narrow field of view. This is adequate for an audience positioned directly in front of the screen (for example, a narrow/small classroom), but not for a trade show or like environment where it is desired to provide clearly visible images (to attract customers) in a much wider field-of-view. Furthermore, the screen is flat in the vertical dimension, thereby not focusing (directing) the projected image at the eyes of a viewer. This is problematic in a trade show or like environment where many visual cues or lighting arrangements are presented which detract from the visibility of the projected image. In addition, the device of Meersseman has a rather complicated assembly structure requiring a large number of fairly complex, specially made mounting brackets and frame members.

The device of Randolph is heavy, rigid, complex and non-compactible.

SUMMARY OF THE INVENTION

Accordingly, it is an object of the present invention to overcome the shortcomings of the prior art and provide additional benefits.

It is another object of the present invention to provide a screen for a trade show or other environment that is lightweight, readily portable (easy to transport and setup/breakdown), and facilitates clear projection to a relatively wide field of view.

It is yet another object of the present invention to provide a screen that facilitates projection of visibly discernible images in a high light, high visual distraction environment.

These and related objects of the present invention are achieved by use of a lightweight, curved projection screen for trade show and other uses as described herein.

The attainment of the foregoing and related advantages and features of the invention should be more readily apparent to those skilled in the art, after review of the following more detailed description of the invention taken together with the drawings.

DETAILED DESCRIPTION

Figure 1:
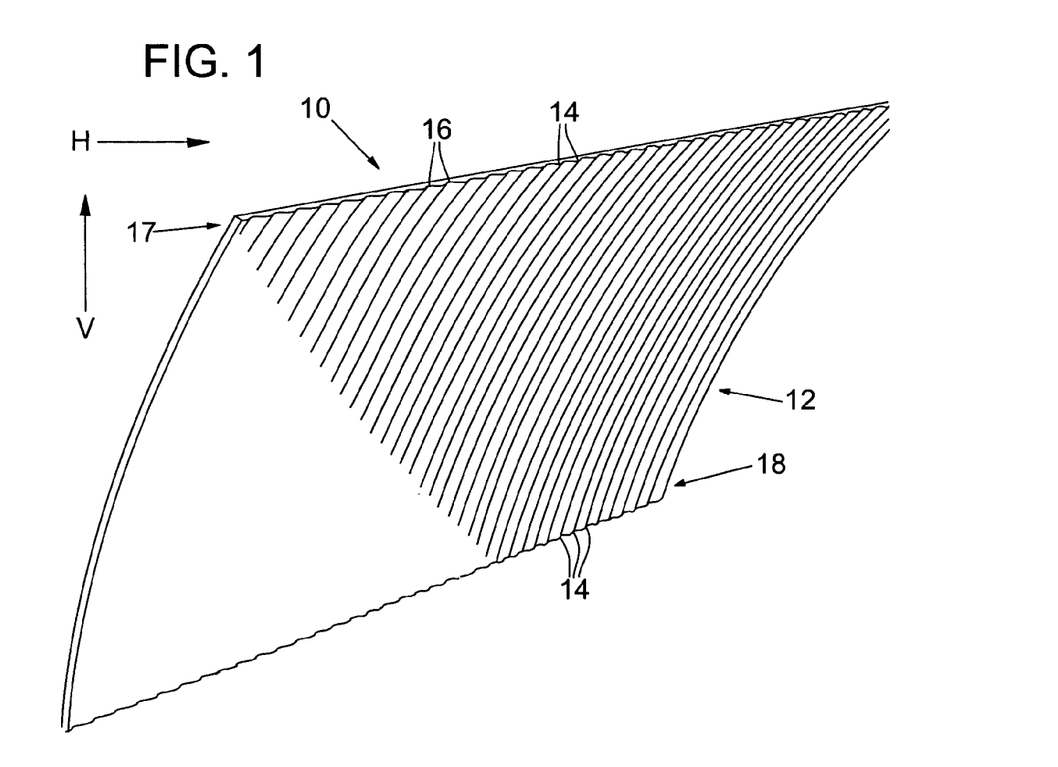
FIG. 1 is a perspective view of one embodiment of a screen having a shape and surface relief in accordance with the present invention.

Referring to FIG. 1, a perspective view of one embodiment of a screen 10 having a shape and surface relief in accordance with the present invention is shown. Screen 10 is characterized in that it has a generally concave shape about a horizontal axis and its reflective surface 12 is undulated, including a plurality of alternating ridges 14 and troughs 16 extending from the top 17 to the bottom 18 of the screen. The ridges and troughs are preferably arranged in parallel and evenly spaced, but may be otherwise configured as noted below.

Figure 2:
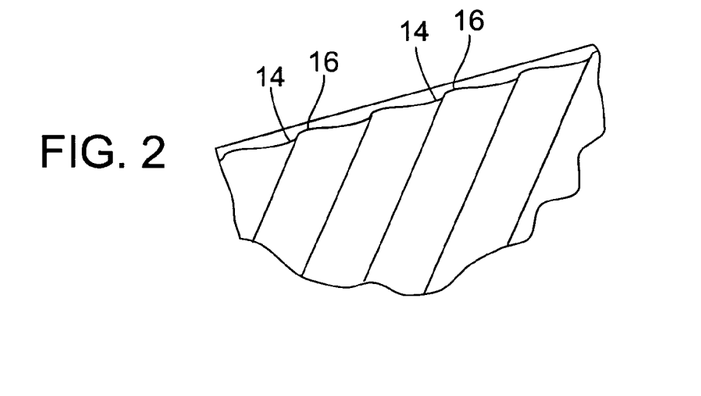
FIG. 2 is a perspective close-up view of a section of the screen of FIG. 1.

FIG. 2 is a perspective close-up view of a section of screen 10 of FIG. 1 illustrating details of the alternating ridges 14 and troughs 16.

The surface configuration and light reflecting properties of screen 10 are preferably the same or similar to those described in You (U.S. Pat. No. 5,414,558), which is hereby incorporated by reference. The pattern of alternating ridges 14 and troughs 16 on undulating surface 12 cause perpendicularly incident light to reflects in part laterally such that the image projected onto the screen may be clearly seen from a wide viewing angle.

Screen 10 is preferably made of a lightweight, flexible and compactible material (where "compactible" is intended to mean that the screen may be rolled or folded or disassembled into smaller pieces or the like to achieve a smaller size for transport and/or storage). The screen is preferably bias mounted to a support structure (as discussed below with reference to FIG. 4 and others) that holds the screen taut and uniformly distributed and in a desired curved shape.

Referring to FIGS. 3A-3D, cross-sectional section views of four different embodiments of screen 10 in accordance with the present invention are shown.

Figure 3A:
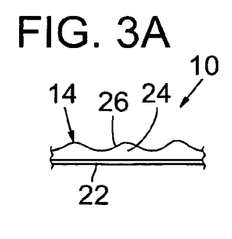
FIGS. 3A-3D are cross-sectional section views of four different embodiments of the screen of FIG. 1 in accordance with the present invention.

FIG. 3A illustrates one embodiment of screen 10 in accordance with the present invention in which the screen includes a layer of fabric, synthetic (e.g., nylon, etc.) or natural, or the like 22 that is coated or stamped with a rubberized (or other suitable) material 24 that is formed with the desired undulating pattern. Reflective material 26 may be added to the patterned material 24 or painted or otherwise applied to the exterior surface of material 24 to provide the desired reflectivity. In the painted form, reflective material 26 may be silver paint with a reflective finish. Alternatively, reflective material 26 may be reflective particles provided at the exterior surface.

Figure 3B:
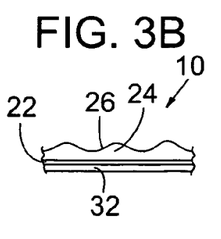

FIG. 3B illustrates another embodiment of screen 10 that is similar to that of FIG. 3A, yet adds a flexible plastic substrate or the like 32 that structurally enhances the embodiment of FIG. 3A. Substrate 32 may be glued or otherwise fixedly attached to fabric 22. Substrate 32 may be formed of flexible sheet plastic, such as Mylar® or the like, or any other suitable lightweight and flexible material.

Figure 3C:
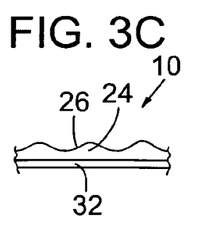

FIG. 3C illustrates an embodiment of screen 10 in which the material 24 is applied directly to the reinforcing substrate 32, i.e., fabric layer 22 is excluded.

Figure 3D:
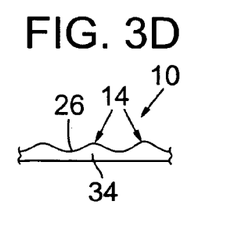

FIG. 3D illustrates an embodiment of screen 10 in which the desired undulating pattern is formed directly in a plastic substrate 34. The reflective material 26 may be formed in or painted on or otherwise provided at the surface of the patterned substrate 34.

Figure 4:
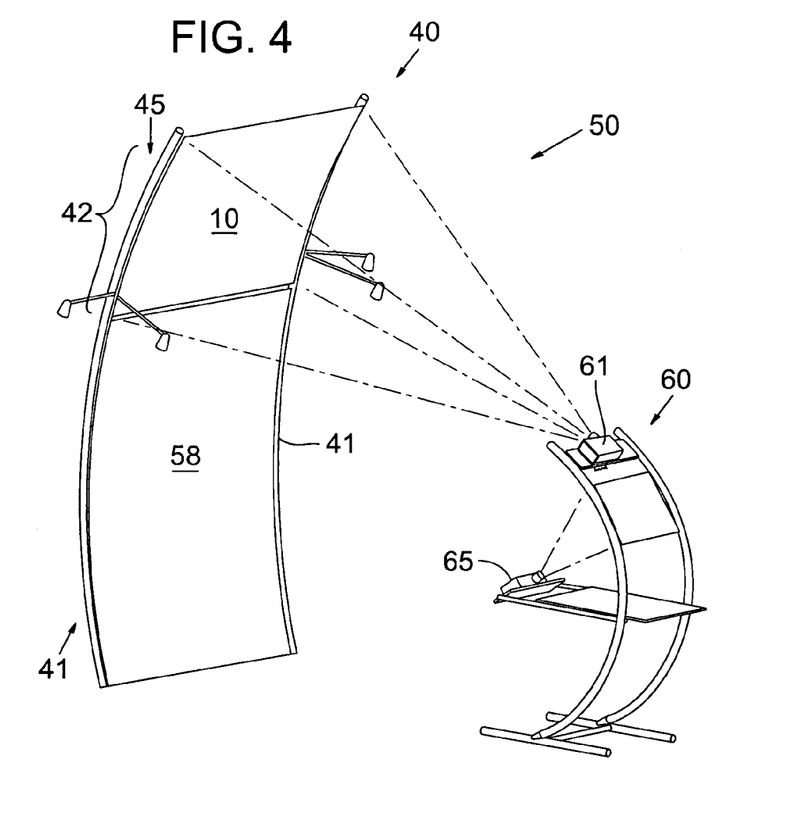
FIGS. 4-8 illustrate three perspective views and a section view, respectively, of an arrangement and various components of a tradeshow setup or booth display incorporating the screen of FIG. 1 in accordance with the present invention.

For a tradeshow booth (as shown in FIG. 4 below), a spacing of 1 mm between ridges 14 is suitable. In other embodiments, this spacing may be 10 mm or less or 5 mm or less or another measure, including being greater than 10 mm. It should be recognized that the distance between the ridges may vary widely. To some extent the spacing is based on scale and the inherent ability and/or limitation of the human eye with respect to image perception and resolution.

It should also be recognized that while the ridge and trough pattern are illustrated as being sinusoidal in cross-section, they may be otherwise configured. For example, they may be a collection of hemi-circles, peaks defined by round troughs and/or randomly arranged peaks as disclosed in FIGS. 4, 5 and 7 of U.S. Pat. No. 6,574,041, entitled Projection Screen and Projection Method, by the inventor herein, which is hereby incorporated by reference, or otherwise configured so as to reflect light laterally to a wide field of view. The depths of the troughs may vary.

The fabric screen material is preferably flexible but not substantially stretchable. Suitable fabric and plastic sheer material are available commercially, though patterning the fabric and/or plastic substrate is a teaching of the present invention. A stretchable material may be used, though care must be exercised to maintain the desired configuration of the ridges so that the reflected image is not distorted.

Referring to FIGS. 4-8, an arrangement and various components of a tradeshow setup or booth display 50 in accordance with the present invention are shown. FIG. 4 illustrates a perspective view of one setup arrangement that includes a large structure 40 including projection screen 10 and a small structure 60 on which a projector 61 is mounted for projection onto screen 10, though projector 61 may be otherwise located. By placing the projector above head level, booth visitors can walk about without interrupting projection.

Figure 5:
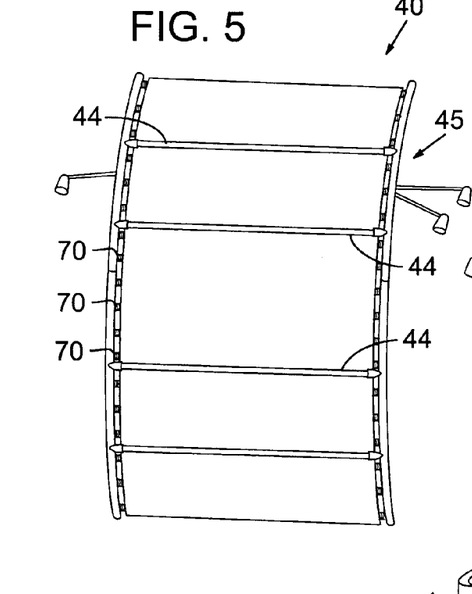
Figure 6:
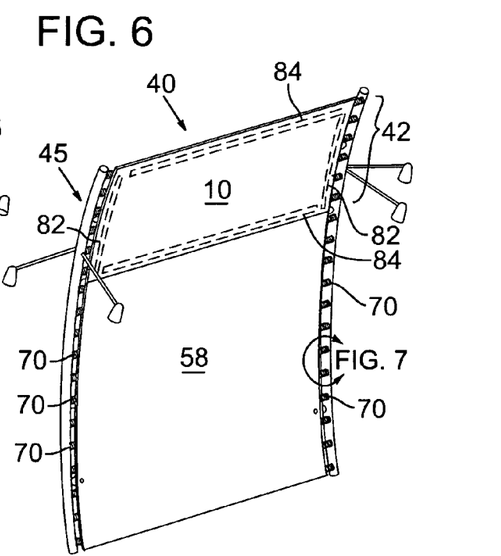
Figure 7:
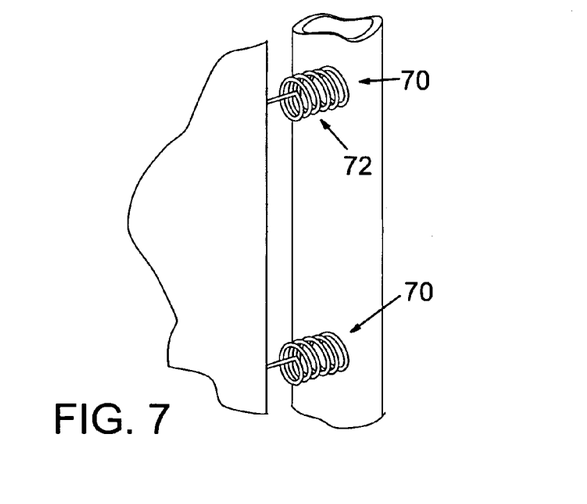
Figure 8:
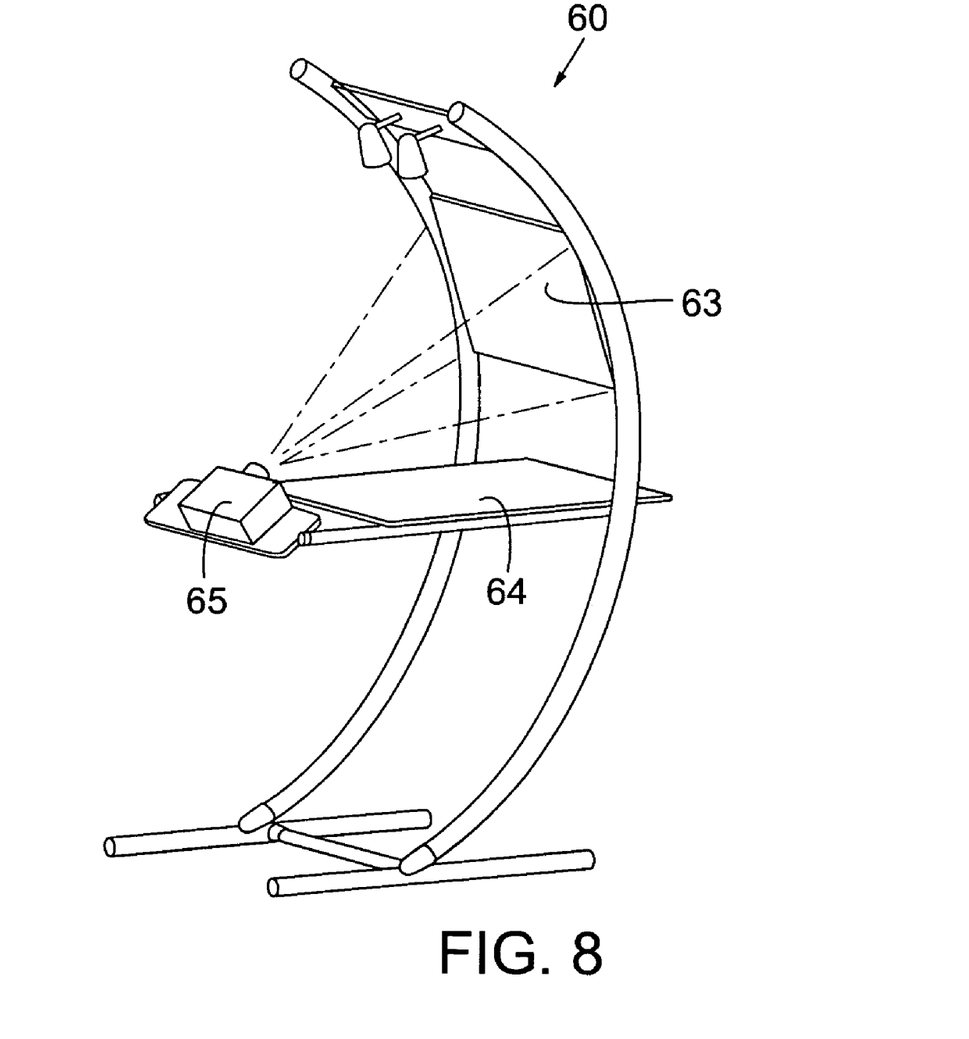

FIG. 5 illustrates the back of large structure 40. FIG. 6 illustrates the front of large structure 40 showing one embodiment of a bias member arrangement. FIG. 7 is a sectional view illustrating a pair of biased attachment members 70. FIG. 8 is perspective view of the smaller structure 60 of FIG. 4. It should be noted in FIGS. 4 and 6 and others herein that the vertical ridges on screen 10 are not shown for clarity of drawing.

Structure 40 includes a frame 45 having a pair of vertically ascending frame members 41. Screen 10 is preferably coupled to the vertical support members 41 by a plurality of biased releasable attachment members 70 or other means. While vertical frame members 41 are curved in their entire length in the embodiment of FIG. 4, this need not be the case. It is preferred, however, that a section 42 to which screen 10 is directly coupled be curved so that screen 10 has a curved shape. Horizontal support members 44 hold the vertical support members in a desired position. Various decoupleable attachment mechanisms for a tradeshow display frame structure are known in the art.

A printed display fabric or the like 58 displaying promotional information and/or images may be mounted to the support structure below screen 10.

The concave curving and/or angling of screen 10 reflects a projected image in a preferred direction so that trade show viewers at various locations can readily perceive the projected image. The vertically arranged surface variations cause the projector light to be reflected at a relatively wide-angle range (nearly 180 degrees) horizontally. Note that the term "vertical" in describing the orientation of the ridges is used herein in a general sense to distinguish from horizontal, but the curved ridges are not by definition wholly vertical. The ridges or surface variations run rather from top to bottom and/or vice versa.

Given the shape and orientation of screen 10, light from directions other than that of projector 61 are, to a significant extent, not reflected off screen 10 towards viewers on the trade show floor. In trade show environments, where there are bright lights from the ceiling and other vendors and many other visual distractions, the orientation and reflective properties of screen 10 are sufficient to achieve a clear, high contrasting image reflected from screen 10 (in an otherwise "visually-crowded" environment).

FIG. 5 illustrates the vertical and horizontal support members 41, 44 and the back side of screen 10 and display fabric 58.

FIG. 6 illustrates one arrangement of biased fastening members 70 for holding screen 10 and display fabric 58 taut within frame 45.

FIG. 6 also illustrates that if desired, supplemental vertical 82 and/or horizontal 84 support members may be provided for screen 10. These members may be made of plastic, fiberglass or other suitable material and fit into a complementarily designed pouch located on the back side (or otherwise) of screen 10. These members provide additional support to screen 10, if needed, to assure that the screen maintains a desired shape.

FIG. 7 illustrates a sectional view of one embodiment of biased releasable fastening members 70 in accordance with the present invention. Each member 70 may include a coiled spring portion 72 and an attachment end (obscured from view by screen 10) that is clamped, stitched, hooked or otherwise affixed to the screen. Various biased fastening means may be used.

FIG. 8 illustrates features of small structure 60 of FIG. 4. Small structure 60 may have a transparent rear-projection screen 63 so that a passerby may be visually stimulated to inquire further. The smaller structure may also have a display table 64 for holding merchandise or brochures. A second projector 65 may be provided at the end of this table for projection onto the transparent screen 63. Projector 61 of FIG. 4 is not shown in the embodiment of FIG. 8.

Figure 9:
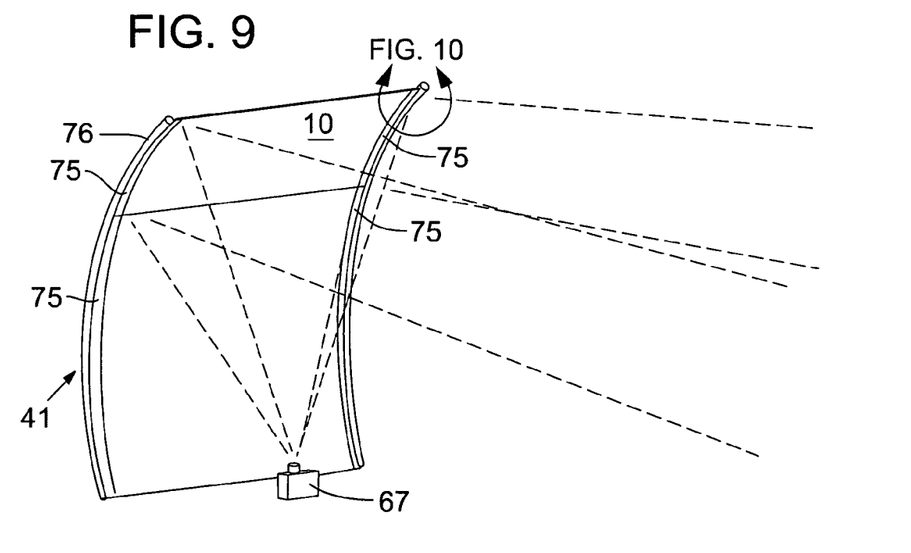
FIGS. 9 and 10 are a perspective view and a sectional view of another mechanism for releasable, biased attachment of a screen in accordance with the present invention.
Figure 10:
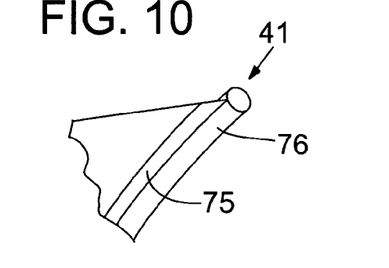

FIG. 9 illustrates a biased attachment mechanism in which an elastic band 75 is stitched to screen 10 and mounted by a sleeve 76 to the frame. FIG. 10 is a more detailed section view from FIG. 9 that illustrates the screen 10, band 75, sleeve 76 and frame member 41. The elastic band provides evenly distributed tension (bias) along the vertical length of screen 10. The elastic band 75 may be provided on one or more sides of screen 10.

FIG. 9 also illustrates that screen 10 may be curved and/or angled such that a projector 67 may be placed below the screw in close proximity to (or even in) the "vertical column" of screen 10. In a trade show booth, there is often little room. Being able to project a clear image from below, rather than from some distant place across, may be very important in the limited footprint of a tradeshow booth. Note that the screen in FIG. 9 is angled at an appropriate angle to reflect an image projected from below out laterally (substantially horizontally and slightly below) towards people walking around a tradeshow floor (or the like).

Figure 11:
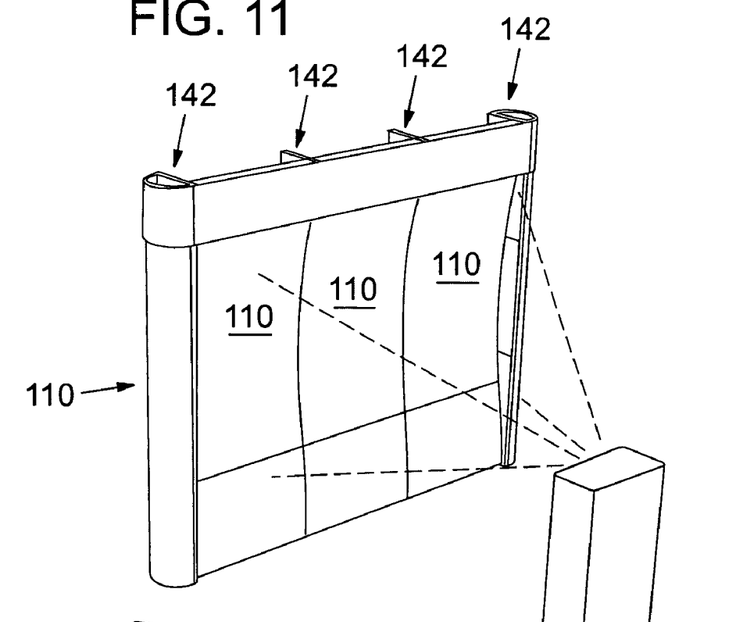
FIGS. 11-12 are perspective views illustrating other embodiments of a projection screen in accordance with the present invention.

FIG. 11 illustrates an embodiment of the present invention that includes a plurality of curved panels that individually and collectively form a screen 110, similar in light reflection properties to screen 10 of FIG. 1. The panels are appropriately sized for a tradeshow environment and are lightweight, decouplable and compactible (as discussed herein) for easy transport. In this embodiment, the vertical members 142 (largely obscured from view by screen 110) may be suitably curved that a flexible fabric-type screen 10,110 may be mounted directly to the frame to have the desired curved shape. Velcro® or magnetic strips or other fasteners can be used to mount the screen to the frame. A biasing member may also be used in attachment (for example, as discussed above) to retain the screen in a taut, appropriately shaped position.

Figure 12:
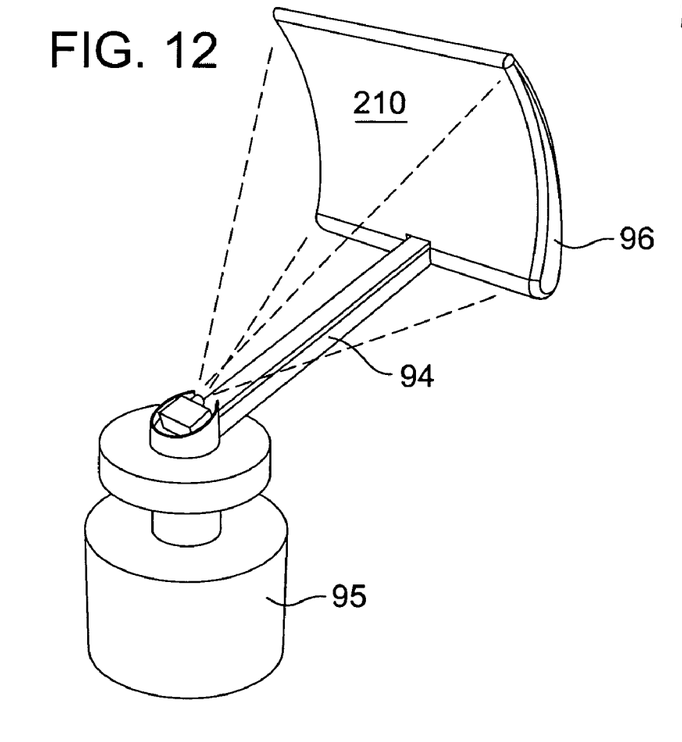

FIG. 12 illustrates a screen 210 preferably having the light reflecting properties of screen 10 of FIG. 1 extending by an arm 94 from a base unit 95. The screen may be a fabric screen or other that is attached to the horizontally concave frame 96 as discussed elsewhere herein.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A screen for use in a trade show or the like environment, comprising:
    a screen member including a sheet of flexible material on which are provided a plurality of substantially parallel ridges and intervening troughs extending from the top to the bottom of the screen member;
    a decoupleable frame structure; and
    a releasable fastening mechanism for releasably mounting the screen member to the frame structure;
    wherein, when mounted, the screen member has a shape that is substantially concave about a horizontal axis; and
    wherein the reflectivity of the surfaces of the ridges and troughs is substantially the same.

2. The screen of claim 1, wherein the plurality of ridges are aligned substantially perpendicularly to the horizontal axis.

3. The screen of claim 1, wherein the ridges are spaced by a distance of 10 millimeters or less.

4. The screen of claim 1, wherein the releasable fastening mechanism includes a bias mechanism for biasedly fastening the screen member to the frame structure.

5. The screen of claim 4, wherein the bias mechanism includes one or more of:
    a plurality of spring biased members arranged about the screen member, and
    an elastic band provided on one or more sides of the screen member,
    for holding the screen member tautly to the frame structure.

6. The screen of claim 1, wherein the sheet of material includes a sheet of fabric on which a material having the plurality of parallel ridges formed therein is provided.

7. The screen of claim 1, wherein the sheet of material includes a sheet of flexible plastic.

8. The screen of claim 1, wherein the frame structure is configured to hold the screen member in a position such that projection onto the screen member from a point substantially under the screen member is primarily reflected laterally outwardly to be viewable from a horizontal plane transecting a bottom of the screen member.

9. A projection screen for use in a trade show environment, comprising:
    a flexible screen member having a plurality of alternating ridges and troughs arranged substantially from a top to a bottom thereof;
    a decoupleable frame structure;
    a releasable coupling mechanism for releasably mounting the screen member to the frame structure; and
    a bias mechanism for holding the screen member tautly to the frame structure;
    wherein the screen member and frame structure are configured such that the screen member when mounted has a substantially concave shape about a horizontal axis; and
    wherein the bias mechanism includes one or more of:
    a plurality of spring biased members arranged about the screen member,
    an elastic band provided on one or more sides of the screen member, and
    a non-metallic elastic material provided on one or more sides of the screen member,
    for holding the screen member tautly to the frame structure.

10. The screen of claim 9, wherein the plurality of ridges are each provided in a vertical plane substantially perpendicular to the horizontal axis.

11. The screen of claim 9, wherein the ridges are spaced by a distance of 10 millimeters or less.

12. The screen of claim 9, wherein the flexible screen member includes a sheet of flexible material that is sufficiently flexible to be at least one of:
    rolled about itself by a user for storage and transport and unrolled for use; and
    folded over itself by a user for storage and transport and unfolded for use.

13. The screen of claim 9, wherein the sheet of material includes a sheet of fabric on which a material having the plurality of parallel ridges formed therein is provided.

14. The screen of claim 9, wherein the sheet of material includes a sheet of flexible plastic.

15. A projection screen, comprising:
    a screen member including a sheet of flexible material;
    a decoupleable frame structure;
    a releasable coupling mechanism for releasably mounting the screen member to the frame structure; and
    a bias mechanism for holding the screen member tautly to the frame structure;
    wherein the screen member and frame structure are configured such that the screen member when mounted has a substantially concave shape about a horizontal axis; and
    wherein the sheet of flexible material is sufficiently flexible to be at least one of:
    rolled about itself by a user for storage and transport and unrolled for use; and
    folded over itself by a user for storage and transport and unfolded for use.

16. The screen of claim 15, wherein the sheet of material includes one or more of:
   a sheet of fabric on which a material having the plurality of parallel ridges formed therein is provided, and
   a sheet of flexible plastic.

17. The screen of claim 15, wherein the sheet of flexible material has a plurality of alternating ridges and troughs extending substantially from a top to a bottom thereof.

18. The screen of claim 17, wherein the ridges are spaced by a distance of 10 millimeters or less.

19. The screen of claim 15, wherein the bias mechanism includes one or more of:
   a plurality of spring biased members arranged about the screen member, and
   an elastic band provided on one or more sides of the screen member,
   for holding the screen member tautly to the frame structure.

20. The screen of claim 15, wherein the sheet of flexible material includes a sheet of flexible nonmetallic material.

21. The screen of claim 20, wherein the flexible screen member includes a sheet of flexible material is sufficiently flexible to be at least one of:
   rolled about itself by a user for storage and transport and unrolled for use; and
   folded over itself by a user for storage and transport and unfolded for use.

22. A projection screen, comprising:
   a flexible screen member having a plurality of alternating ridges and troughs arranged substantially from a top to a bottom thereof;
   a decoupleable frame structure;
   a releasable coupling mechanism for releasably mounting the screen member to the frame structure; and
   a bias mechanism for holding the screen member tautly to the frame structure;
   wherein the frame structure is configured to hold the screen member in a position such that projection onto the screen member from a point substantially under the screen member is primarily reflected laterally outwardly to be viewable from a horizontal plane transecting a bottom of the screen member.

* * * * *